United States Patent [19]

Standley

[11] 4,018,054

[45] Apr. 19, 1977

[54] YIELDABLE JOINT

[75] Inventor: Robert S. Standley, Middletown, Ohio

[73] Assignee: Armco Steel Corporation, Middletown, Ohio

[22] Filed: Nov. 6, 1975

[21] Appl. No.: 629,275

[52] U.S. Cl. .............................. 61/45 R; 403/388; 403/2

[51] Int. Cl.² ........................................ E21D 11/22

[58] Field of Search .......... 403/388, 363, 379, 408, 403/2, 393, 41; 52/758 F; 188/1 C; 61/45 R, 45 C

[56] References Cited

UNITED STATES PATENTS

| 3,318,099 | 5/1967 | Sugden | 403/363 X |
| 3,413,813 | 12/1968 | Rock et al. | 403/363 X |
| 3,419,843 | 12/1968 | Hays | 403/388 X |
| 3,492,888 | 2/1970 | Nishimura et al. | 188/1 C |

FOREIGN PATENTS OR APPLICATIONS

| 801,031 | 12/1950 | Germany | 52/758 F |
| 772,751 | 4/1957 | United Kingdom | 61/45 R |

Primary Examiner—Andrew V. Kundrat
Attorney, Agent, or Firm—Melville, Strasser, Foster & Hoffman

[57] ABSTRACT

A yieldable joint between two elements such that the adjacent lapped edges of the elements will shift relative to each other. The joint comprises a pair of plates to be joined by lapping adjacent edges thereof, pairs of corresponding perforations in the lapped plate edges, and a bolt passing through each of the pairs of corresponding perforations. At least one perforation of each pair of corresponding perforations comprises a keyhole elongated in the direction along the line of relative movement of the pair of plates, with one end of the keyhole being of such size as to freely receive the shank of the bolt and the remaining elongated portion thereof being of a width less than the diameter of the shank of the bolt.

6 Claims, 6 Drawing Figures

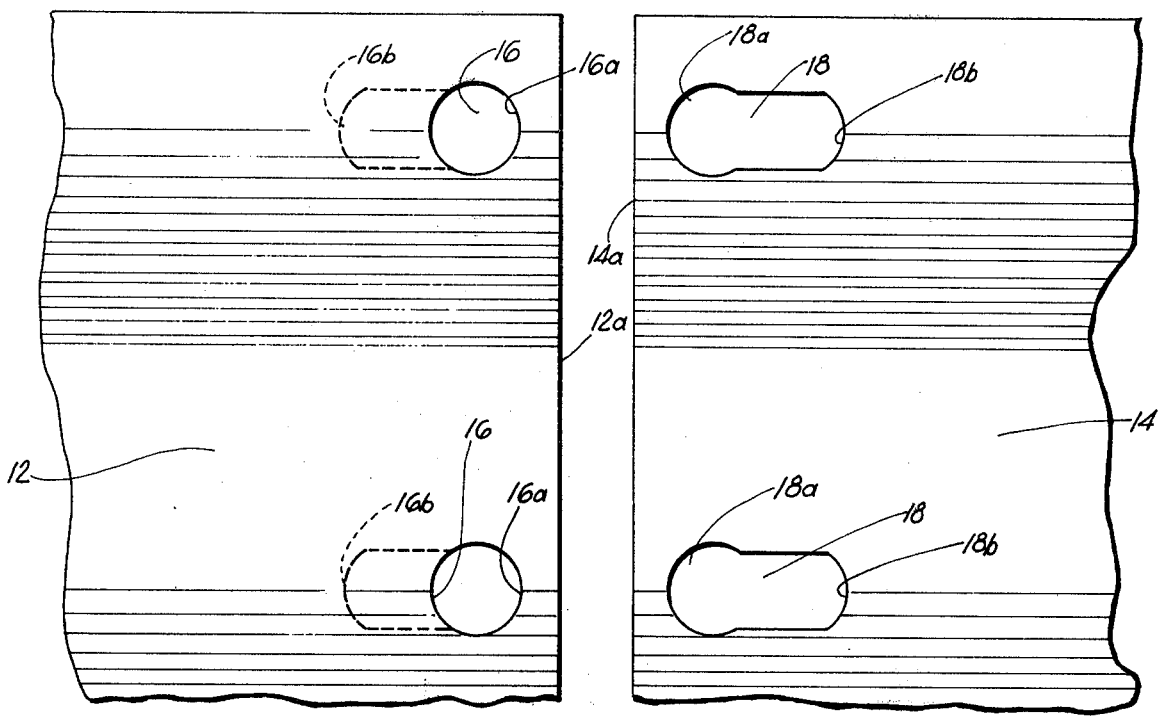
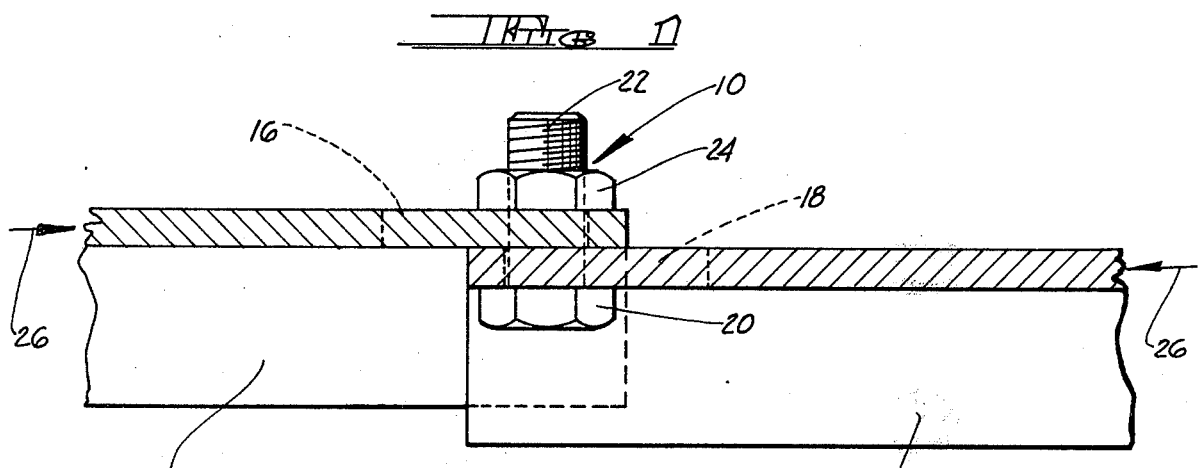
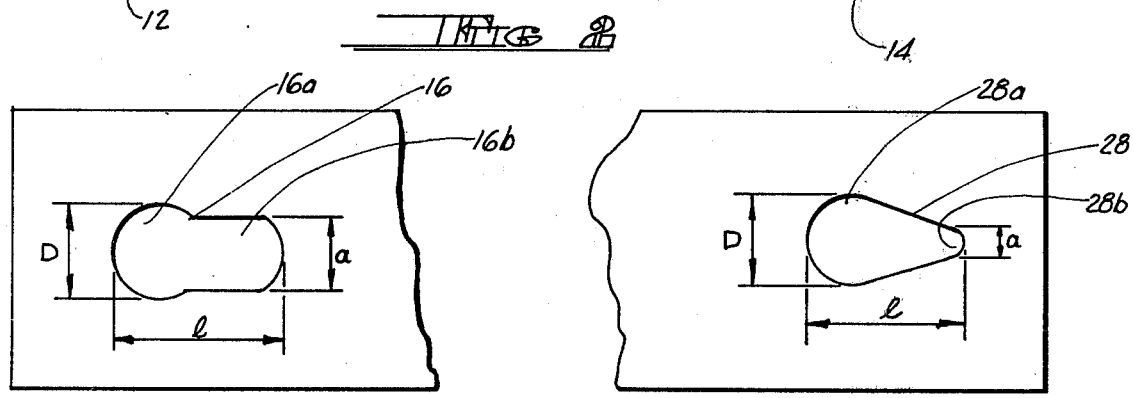

YIELDABLE JOINT

BACKGROUND OF THE INVENTION

1. Field of the Invention

The present invention relates to a yieldable joint between two elements such that the adjacent lapped edges of the elements will shift relative to each other, and more particularly to a yieldable joint which bolts together initially in correct alignment and has the ability to carry a pre-determined amount of load before any yielding can occur.

2. Description of the Prior Art

Yieldable connections which allow a lapped joint to yield under compressive load and thereby reduce the circumference of a structure so that, for example, soil may carry the load instead of the structure, and, therefore, the metal thickness of the structure may be diminished, are not new. Such connections have utilized conventional slotted holes and various other yielding devices such as sliding friction, weak bolts or compressible material. Exemplary connections are disclosed in U.S. Pat. Nos. 3,413,813, in the name of J. H. Rock, et al, 3,574,376, in the name of Wayne Cummins, and 2,645,264, in the name of Phillip Rosenberg. However, such connections have had a number of major short comings, primarily because they have utilized slotted holes and the yielding of the connections has depended upon bolt tightness and the friction between the plates to prevent premature yield of the joints. These factors are very difficult to control and highly variable. Accordingly, it has been difficult to safely design structures incorporating such connections to carry a substantial and practical overfill or pressure before any circumferential yielding occurs.

SUMMARY OF THE PRESENT INVENTION

The present invention provides a yieldable joint between two elements such that the adjacent lapped edges of the elements will shift relative to each other. In its broadest application, the joint comprises a pair of plates to be joined by lapping adjacent edges thereof, pairs of corresponding perforations in the lapped plate edges, and a bolt passing through each of the pairs of corresponding perforations. At least one perforation of each pair of corresponding perforations comprises a keyhole elongated in the direction along the line of relative movement of the pair of plates. One end of each keyhole is of such size as to freely receive the shank of the bolt and the remaining elongated portion thereof is of a width less than the diameter of the shank of the bolt. Accordingly, the elongated perforations will permit relative movement of the plates only upon deformation and widening of the remaining elongated portions, with the shape and size of the remaining elongated portions determining the force required for the relative movement of the plates.

In a preferred embodiment the elements comprise one of a plurality of pairs of adjacent plates forming a buried structure.

In a further embodiment both perforations of each pair of corresponding perforations comprise a keyhole perforation. Finally, in still further embodiments the remaining elongated portion of each of the keyholes may be of a constant width or may be tapered with the largest dimension thereof being adjacent the one end of the keyhole which freely receives the shank of the bolt.

The keyhole perforation of the yieldable joint of the present invention makes it practical to provide a slotted type bolted joint in field assembled corrugated structures. If conventional slots were used, it would be difficult and impractical to assemble the structure. The round holes are essential to proper positioning of the plates in relation to each other. The keyhole perforations allow the structure to carry a significant amount of load before any yielding will occur. The force required to drive the bolt into the slightly narrower slot portion of a key perforation is known within the accuracy required and a structure incorporating the yieldable joint of the present invention can very safely be designed to carry a substantial and practical overfill or pressure before any circumferential yielding occurs, i.e., the keyhole perforation functions exactly like an ordinary round hole during the erection and assembly of the structure and carries a predetermined amount of load before any yielding can occur.

BRIEF DESCRIPTION OF THE DRAWINGS

FIG. 1 is a partial plan view of pairs of plates to be joined before lapping and prior to bolting together.

FIG. 2 is an enlarged, side elevational view of a yieldable joint of the present invention after bolting.

FIG. 5 is a cross sectional view through a buried structure formed by a plurality of pairs of adjacent plates incorporating the yieldable joint of the present invention.

FIG. 6 is a graphical summary of the results of a testing program on the yieldable joint of the present invention as compared to a typical standard joint.

Turning now to FIGS. 1 and 2, it will be seen that the present invention provides a usable joint 10 between two elements such that the adjacent lapped edges of the elements will shift relative to each other. The joint 10 comprises a pair of plates 12 and 14 to be joined by lapping adjacent edges 12a and 14a thereof, respectively, at least one pair of corresponding perforations 16 and 18 in the lapped plate edges 12a and 14a, respectively, and a bolt 20 passing through each of the pairs of corresponding perforations 16 and 18.

Figure 3:
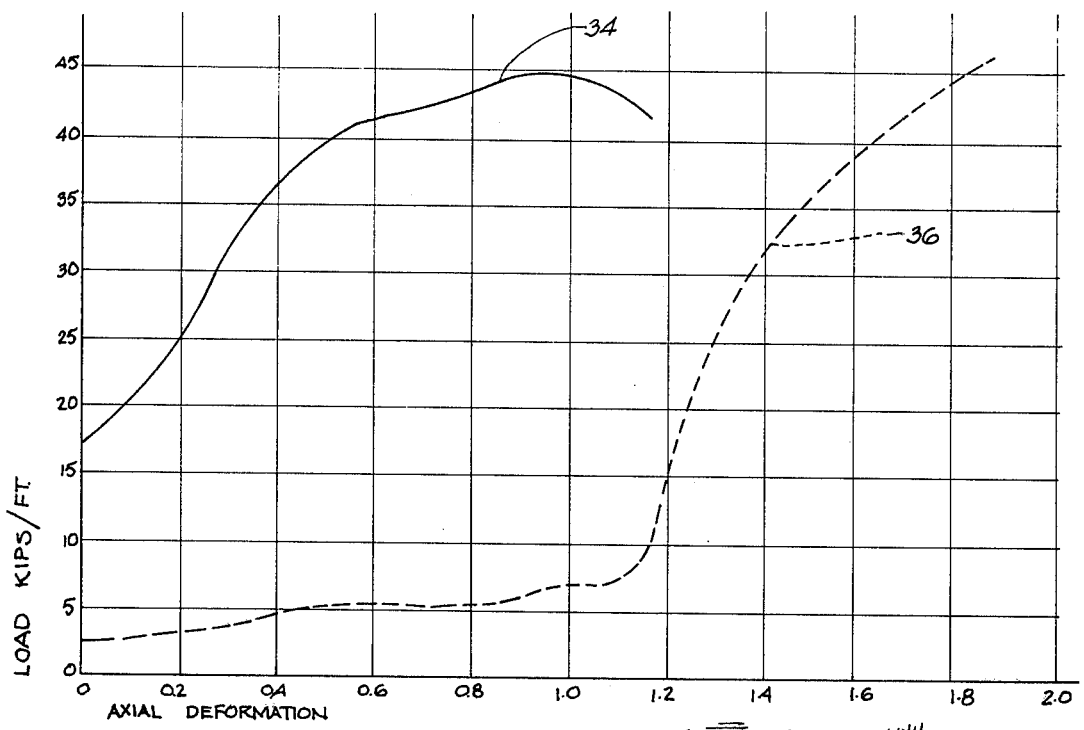
FIG. 3 and 4 are plan views of plates showing variations in the perforations.

At least one perforation of each pair of corresponding perforations 16 and 18, comprises a keyhole elongated in the direction along the line of relative movement of the pair of plates 12 and 14. One end 16a, 18a of each keyhole is of such size as to freely receive the shank 22 of the bolt 20 and the remaining elongated portion 16b, 18b thereof is of a width less than the diameter of the shank 22 of the bolt 20. As can be seen, the keyhole perforations 16 and 18 will permit relative movement of the plates 12 and 14 only upon deformation and widening of the elongated portions 16b and 18b of the keyhole perforation 16 and 18 by the shank 22 of the bolt 20, with the shape of the elongated portions 16b and 18b determining the force 26 required for the relative movement of the plates 12 and 14.

As previously indicated, it is only necessary that one perforation 16, 18 of each pair of corresponding perforations comprise a keyhole elongated in the direction along the line of relative movement of the pair of plates 12 and 14. However, both perforations 16, 18 of each pair of corresponding perforations may comprise the keyhole perforation.

As shown in FIG. 3, the remaining elongated portion 16b of the keyhole perforations 16, may be of a constant width "a".

Figure 4:
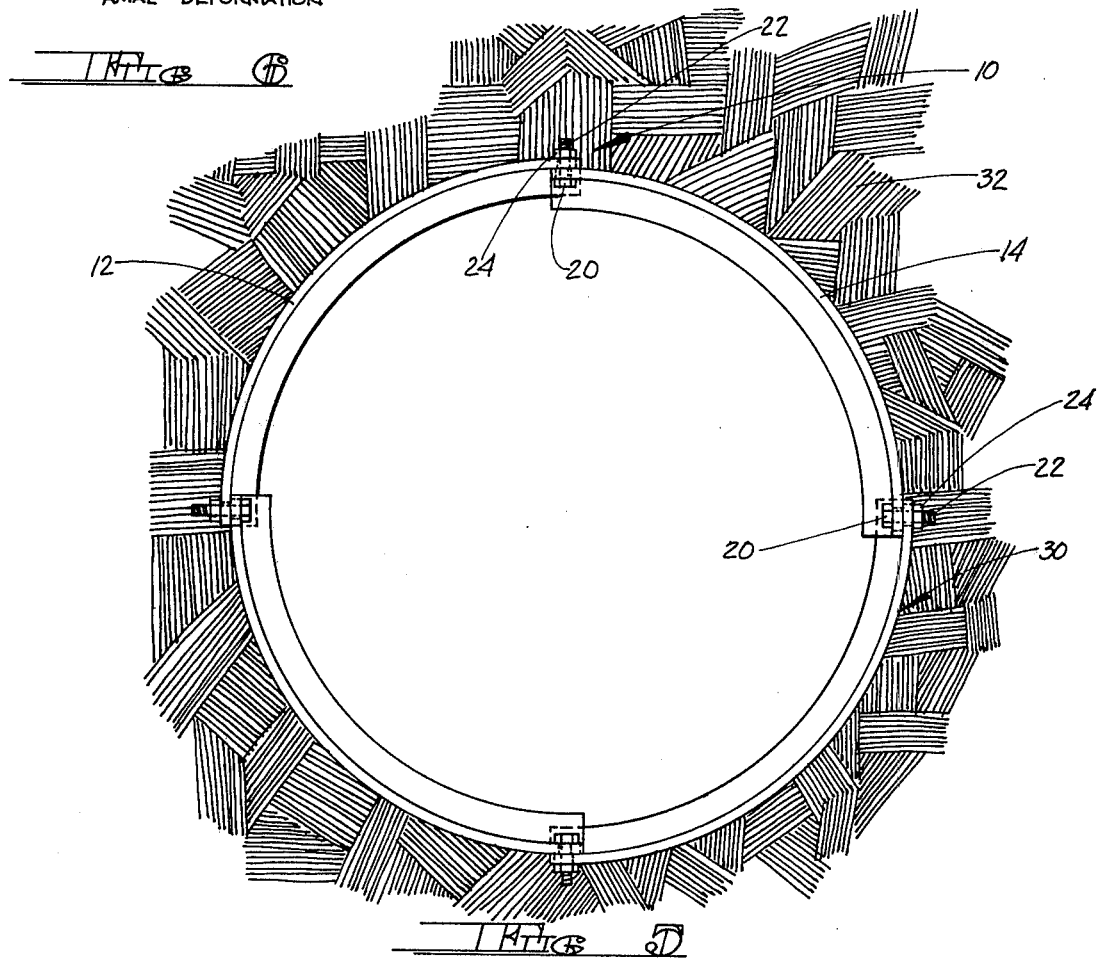

As best seen in FIG. 4, the remaining elongated portion 28b of each keyhole perforation 28 may be tapered, with the largest dimension thereof being adjacent the one end 28a, thereof which freely receives the shank 22 of the bolt 20. In practice, the one end 28a of the keyhole perforation 28, 18 is round.

In FIGS. 3 and 4, "D" represents the diameter of the normal round hole at the end 16a, 18a, 28a used in the joint 10 of the present invention. The present invention adds the keyhole slot of width "a" to the circle of diameter "D" for a combined hole and slot of overall length "l". The width "a" is slightly less than the diameter of the shank 22 of the bolt 20 to be used. The length "l" is variable according to the amount of possible movement of the bolt 20 into the slot 16b, 18b, 28b which is desired. Normally, for common size and thicknesses of corrugated metal structures which use a ¾ inch bolt, the keyhole would have dimensions of approximately D = 7/8 inch, a = 11/16 inch, and l = 1⅜ inch. As can be seen, the principal variations are in the dimensions D, a and l.

In general it has been found that each of the elongated keyholes 16, 18, 28 of the yieldable joint 10 of the present invention is formed according to the formulae:

$L = D + ½$ inch and
$a =$ Bolt Diameter $- 1/16$ inch, wherein:
$L =$ the overall length of the keyhole (combined hole and slot);
$D =$ the diameter of the round hole portion; and
$a =$ the width of the elongated slot portion; or
$L = D + M$ and
$a = B - e$,
wherein,
$L =$ the overall length of the keyhole (combined hole and slot);
$D =$ the diameter of the round hole portion;
$M =$ the length of yield movement desired;
$a =$ the width of the elongated slot portion;
$B =$ the bolt diameter; and
$e =$ the reduction in width that requires the desired initial load before yielding occurs;

and a structure surrounded by soil and incorporating therein the yieldable joints 10 of the present invention, may be designed to carry a substantial and predetermined overfill before any circumferential yielding occurs.

Turning now to FIG. 5, a typical buried structure 30 formed by a plurality of pairs of adjacent plates 12 and 14 incorporating the yieldable joint 10 of the present invention is shown. It will, of course be understood that since the "yielding ring" principle of structural behavior of a buried or underground structure is applicable to many possible types of structural materials and shapes, the joint 10 of the present invention is not limited to use with any particular structure and that the disclosure of FIG. 5 is merely exemplary. For example, the joint 10 of the present invention would of course be applicable to any thing from a tunnel shield to a concrete arch and the size of the keyholes required could thus vary quite widely.

As can be seen from FIG. 5, the yieldable joint 10 of the present invention wherein at least one perforation of each pair of corresponding perforations comprises a keyhole elongated in the direction along the line of relative movement of the pair of plates 12, 14 to be joined, is an improvement on the concept of using a slotted hole in a bolted connection. The keyhole makes it practical to provide a slotted type bolted joint in field assembled corrugated structures, such as the structure 30. If conventional slots were used, it would be difficult and impractical to assemble the structure 30. The round holes 16a, 18a, 28a are essential to proper positioning of the plates 12, 14 in relation to each other. The elongated portions 16b, 18b, 28b allow the structure 30 to carry a significant amount of load before any yielding will occur. With prior art slotted holes, it would be necessary to depend on bolt tightness and friction between the plates to prevent premature yield of the joints. These factors are very difficult to control and highly variable. With the keyhole perforation 16, 18 and 28 of the present invention, the force required to drive the shank 22 of the bolt 20 into the slightly narrower slot portion 16b, 18b and 28b is known within the accuracy required. Thus, a structure 30 incorporating keyhole joints 10 can very safely be designed to carry a substantial and practical overfill 32 or pressure before any circumferential yielding occurs. This is a critical characteristic of a "yielding ring". Thus, as can be seen, the keyhole perforation 16, 18, 28 of the yielding joint 10 of the present invention functions exactly like an ordinary round hole during the erection and assembly of the structure 30 and carry a pre-determined amount of load before any yielding can occur.

Numerous tests have been performed on joints incorporating therein the keyhole slots of the yieldable joints 10 of the present invention and it has been determined that the lapped joints will yield as planned and under load in an actual assembled structure, providing load relief to the structure according to the "yield ring" theory. In this regard FIG. 6 discloses typical load-deformation behavior curves resulting from a testing program, all from 12 inch wide 12 gauge MULTI-PLATE joint compression tests. Solid curve 34 is a typical load-deformation behavior curve of a standard joint taken from an S. I. such as 69-748; no slots, ribbed bolts and 200 foot pound installation torque. Dashed curve 36 is a load-deformation behavior curve of a typical yieldable joint 10 of the present invention utilizing keyhole slotted holes, non-ribbed bolts and installation according to 0.27 inch grip length. It will be noted that with respect to curve 36, an initial load of about 2500 p.s.i. per foot of surface area is supported before yielding occurs. Thereafter, the load is relieved one inch. After yielding one inch, the joint then exhibits the same ultimate strength and deformation characteristics of a standard joint with round holes.

As this invention may be embodied in several forms without departing from the spirit or essential characteristics thereof, the embodiments described herein are, therefore, illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A yieldable joint between one pair in combination with a plurality of joined pairs of adjacent arcuate plates forming an arcuate structure surrounded by soil such that the adjacent lapped edges of the arcuate plates will shift relative to each other, comprising a pair of arcuate plates to be joined by lapping adjacent edges thereof, at least one pair of corresponding perforations in said lapped plate edges, and a bolt passing radially through each of said pairs of corresponding perforations, at least one perforation of each pair of corresponding perforations comprising a keyhole elongated in the direction along the line of relative movement of said pair of plates, one end of each said keyhole being of such size as to freely receive the shank of said bolt and the remaining elongated portion thereof being of a width less than the diameter of the shank of said bolt, whereby said elongated perforations will permit relative movement of said plates only upon deformation and widening of said remaining elongated portions, the shape of said remaining elongated portions determining the force required for said relative movement of said plates, whereby said underground structure may be designed to carry a substantial and predetermined overfill before any controlled circumferential yielding occurs, and whereby said plates provide a practical slotted type bolted joint for field assembled structures because they may be readily positioned as desired in relation to each other.

2. A joint according to claim 1, wherein both perforations of each pair of corresponding perforations comprises a keyhole perforation.

3. A joint according to claim 1, wherein the remaining elongated portion of each said keyhole is of a constant width.

4. A joint according to claim 1, wherein each of said keyholes is formed according to the formulae:

$L = D + \frac{1}{2}$ inch and $a =$ Bolt Diameter $- 1/16$ inch; wherein:

$D =$ the diameter of the round hole portion of said keyhole;

$l =$ the overall length of said keyhole; and $a =$ the width of the elongated portion of said keyhole.

5. A joint according to claim 1, wherein each of said keyholes is formed according to the formulae:

$L = D + M$ and $a = B - e$; wherein:

$L -$ the overall length of said keyhole;

$D =$ the diameter of the round hole portion of said keyhole;

$M =$ the length of yield movement desired;

$a =$ the width of the elongated portion of said keyhole;

$B =$ the bolt diameter; and $e =$ the reduction in width that requires the desired initial load before yielding can occur.

6. A yieldable joint between two elements such that the adjacent lapped edges of the elements will shift relative to each other, comprising a pair of plates to be joined by lapping adjacent edges thereof, at least one pair of corresponding perforations in said lapped plate edges, and a bolt passing through each of said pairs of corresponding perforations, at least one perforation of each pair of corresponding perforations comprising a keyhole elongated in the direction along the line of relative movement of said pair of plates, one end of each said keyhole being of such size as to freely receive the shank of said bolt and the remaining elongated portion thereof being of a width less than the diameter of the shank of said bolt, said remaining elongated portion of each said keyhole being tapered with the largest dimension thereof being adjacent said one end thereof which freely receives the shank of said bolt, whereby said elongated perforations will permit relative movement of said plates only upon deformation and widening of said remaining elongated portions, the shape of said remaining elongated portions determining the force required for said relative movement of said plates.

* * * * *